United States Patent
Fiolka

(10) Patent No.: US 10,908,072 B2
(45) Date of Patent: Feb. 2, 2021

(54) TOTAL INTERNAL REFLECTION AND TRANSMISSION ILLUMINATION FLUORESCENCE MICROSCOPY IMAGING SYSTEM WITH IMPROVED BACKGROUND SUPPRESSION

(71) Applicant: THE BOARD OF REGENTS OF THE UNIVERSITY OF TEXAS SYSTEM, Austin, TX (US)

(72) Inventor: Reto P. Fiolka, Dallas, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 186 days.

(21) Appl. No.: 15/843,788

(22) Filed: Dec. 15, 2017

(65) Prior Publication Data

US 2018/0172578 A1 Jun. 21, 2018

Related U.S. Application Data

(60) Provisional application No. 62/434,922, filed on Dec. 15, 2016.

(51) Int. Cl.
*G01N 21/21* (2006.01)
*G06T 5/00* (2006.01)
(Continued)

(52) U.S. Cl.
CPC ......... *G01N 21/211* (2013.01); *G01N 21/648* (2013.01); *G02B 21/16* (2013.01);
(Continued)

(58) Field of Classification Search
CPC ... G01J 3/4535; G02B 21/0056; G02B 27/10; G02B 27/56; G01N 21/648; G06T 5/003;
(Continued)

(56) References Cited

U.S. PATENT DOCUMENTS 6,255,642 B1 7/2001 Cragg et al.
7,480,042 B1 1/2009 Phillips et al.
(Continued)

FOREIGN PATENT DOCUMENTS

CN 103940796 7/2014
CN 104458683 3/2015
(Continued)

OTHER PUBLICATIONS

Fiolka, Reto et al. "Structured illumination in total internal reflection fluorescence microscopy using a spatial light modulator". Optics Letters, vol. 33, No. 14, Jul. 15, 2008, pp. 1629-1631. (Year: 2008).*

(Continued)

*Primary Examiner* — Michael A Lyons
(74) *Attorney, Agent, or Firm* — Polsinelli PC; Adam C. Rehm

(57) ABSTRACT

Systems, methods, and computer-readable storage media are disclosed for providing a structured total internal reflection fluorescence (sTIRF) imaging system providing improved out of focus blur rejection and improved image contrast. The sTIRF imaging system may be configured to illuminate a sample using two beams of light (e.g., a primary beam of light and an interfering beam of light). The interfering beam of light may be configured to create interference with respect to the primary beam of light. The sTIRF imaging system may be configured to capture a plurality of intermediate images of the sample during the illuminating, and to generate a final image of the sample based on the plurality of intermediate images. The interference caused by the two beams of light may enable the sTIRF imaging system to reject out of focus blur based on detection of whether fluorescence emissions from the sample being imaged fluctuate or remain static.

20 Claims, 11 Drawing Sheets
(6 of 11 Drawing Sheet(s) Filed in Color)

(51) Int. Cl.
*G06T 5/50* (2006.01)
*G06T 1/00* (2006.01)
*G02B 27/10* (2006.01)
*G01N 21/64* (2006.01)
*G02B 21/16* (2006.01)
*G02B 21/36* (2006.01)
*G02B 27/56* (2006.01)

(52) U.S. Cl.
CPC .......... *G02B 21/361* (2013.01); *G02B 27/10* (2013.01); *G02B 27/56* (2013.01); *G06T 1/0007* (2013.01); *G06T 5/003* (2013.01); *G06T 5/50* (2013.01); *G01N 21/6458* (2013.01); *G01N 2021/212* (2013.01); *G06T 2207/10056* (2013.01); *G06T 2207/10064* (2013.01); *G06T 2207/30024* (2013.01)

(58) Field of Classification Search
CPC ............. G06T 5/50; G06T 2207/10056; G06T 2207/10064; G06T 2207/30024
See application file for complete search history.

(56) References Cited

U.S. PATENT DOCUMENTS

| | | | |
|---|---|---|---|
| 8,836,948 B2* | 9/2014 | Liu | G01B 9/04 356/445 |
| 2007/0014002 A1 | 1/2007 | Vodyanoy et al. | |
| 2007/0035818 A1 | 2/2007 | Bahatt et al. | |
| 2008/0076188 A1 | 3/2008 | Patsenker et al. | |
| 2009/0073563 A1 | 3/2009 | Betzig | |
| 2009/0116707 A1 | 5/2009 | Sutko et al. | |
| 2009/0219607 A1* | 9/2009 | Saggau | G02B 21/0016 359/305 |
| 2010/0110441 A1* | 5/2010 | Koshoubu | G01J 3/2889 356/452 |
| 2010/0303386 A1 | 12/2010 | Enderlein | |
| 2011/0084217 A1 | 4/2011 | Redford | |
| 2011/0109962 A1 | 5/2011 | Yang et al. | |
| 2012/0307247 A1* | 12/2012 | Tan | G01N 21/6458 356/445 |
| 2013/0100272 A1 | 4/2013 | Price et al. | |
| 2014/0340482 A1 | 11/2014 | Kanarowski | |
| 2015/0185460 A1 | 7/2015 | Nakasho et al. | |
| 2015/0241351 A1* | 8/2015 | Cooper | G02B 21/14 250/459.1 |
| 2016/0124208 A1* | 5/2016 | Best | G02B 21/0076 359/363 |
| 2016/0195705 A1 | 7/2016 | Betzig et al. | |
| 2019/0025563 A1* | 1/2019 | Fahrbach | G02B 27/58 |

FOREIGN PATENT DOCUMENTS

| | | |
|---|---|---|
| EP | 2977810 | 1/1916 |
| EP | 2479551 | 7/2012 |
| EP | 2803978 | 11/2014 |
| WO | WO 2016/054118 | 4/1916 |
| WO | WO 1994/018594 | 8/1994 |
| WO | WO 1998/058288 | 12/1998 |
| WO | WO 2002/001194 | 1/2002 |
| WO | WO 2005/101086 | 10/2005 |
| WO | WO 2006/036388 | 4/2006 |
| WO | WO 2006/069188 | 6/2006 |
| WO | WO 2009/141390 | 11/2009 |
| WO | WO 2010/084478 | 7/2010 |
| WO | WO 2011/036666 | 3/2011 |
| WO | WO 2011/049965 | 4/2011 |
| WO | WO 2011/150431 | 12/2011 |
| WO | WO 2012/039636 | 3/2012 |
| WO | WO 2013/026762 | 2/2013 |
| WO | WO 2013/049646 | 4/2013 |
| WO | WO 2014/034275 | 3/2014 |
| WO | WO 2014/132053 | 9/2014 |
| WO | WO 2015/089910 | 6/2015 |

OTHER PUBLICATIONS

Ananthanarayanan et al., "Single-molecule imaging of cytoplasmic dynein in vivo," *Methods in Cell Biology*, 2015; 125: 1-12.
Coelho et al., "Single-molecule imaging in vivo: the dancing building blocks of the cell," *Integrative Biology (United Kingdom)*, 2013; 5(5): 748-758.
Fiolka, Reto. "A Clearer View for TIRF and Oblique Illumination Microscopy," *Optica Express*, 2016; 24(26): 12 pages.
Kudalkar et al., "Coverslip cleaning and functionalization for total internal reflection fluorescence microscopy," *Cold Spring Harbor Protocols*, 2016; 5: 459-465.
Leutenegger et al., "Fluorescence correlation spectroscopy with a total internal reflection fluorescence STED microscope (TIRF-STED-FCS)" *Optics Express*, 2012; 20(5): 5243-5263
Spira et al., "Visualization of cortex organization and dynamics in microorganisms, using total internal reflection fluorescence microscopy,"*Journal of Visualized Experiments*, 2012; 63: e3982, pp. 1-7.
Trache et al., "Total Internal Reflection Fluorescence (TIRF) microscopy" *Current Protocols in Microbiology, Supplemental 10*, 2008; 2A.2.1-22.
Van't Hoff et al., "A programmable light engine for quantitative single molecule TIRF and HILO imaging," *Optics Express*, 2008; 16(22): 18495-18504.
Yildiz et al., "Total internal reflection fluorescence microscopy," *Cold Spring Harbor Protocols*, 2015; 9:801-810.

\* cited by examiner

TOTAL INTERNAL REFLECTION AND TRANSMISSION ILLUMINATION FLUORESCENCE MICROSCOPY IMAGING SYSTEM WITH IMPROVED BACKGROUND SUPPRESSION

PRIORITY CLAIM

This Application claims priority to U.S. Provisional Application 62/434,922 filed Dec. 15, 2016, which is incorporated herein by reference in its entirety.

TECHNICAL FIELD

The present disclosure is generally related to total internal reflection fluorescence (TIRF) and highly-inclined laminated optical sheet (HILO) microscopy, and more particularly to structured illumination TIRF (sTIRF) microscopy and structured illumination HILO (sHILO) microscopy imaging systems and techniques that improve rejection of out of focus blur.

BACKGROUND

Total Internal reflection fluorescence (TIRF) microscopy has become an indispensable tool in cell biology. By combining widefield detection with high numerical aperture lenses and optical sectioning with evanescent fields, it enables very sensitive imaging with high signal to background ratios. While TIRF is limited to studying the plasma membrane adjacent to the glass coverslip, an objective launched setup is also compatible with HILO microscopy, with which the entire cell volume can be interrogated. However, the evanescent fields employed in TIRF microscopy are in practice often compromised by light scattering, resulting in photons that can propagate into the far field, which causes fluorescence to be excited well outside the depth of focus of the detection objective and results in out-of-focus blur. Optical transfer functions (OTFs) for detecting fluorescence light in a widefield format often have difficulty rejecting the out-of-focus blur prevalent in TIRF images. Additionally, in densely labeled cells, such out-of-focus blur can significantly reduce the contrast of the final TIRF image and hamper image analysis. Further, two-dimensional structured illumination microscopy (SIM) combined with TIRF is prone to reconstruction artefacts when out-of-focus blur is present. In HILO microscopy, the illumination light is propagating at a shallow angle to the focal plane. Therefore, the beam will only coincide with the focal plane over a small field of view and out-of-focus excitation is inevitable, which may degrade the quality of the obtained images.

SUMMARY

To overcome the limitations of existing TIRF and HILO microscopy techniques, systems, methods, and computer-readable storage media are disclosed for a sTIRF and/or sHILO imaging system that provides improved out of focus blur rejection and improved image contrast. The imaging system(s) of embodiments may be configured to illuminate a sample using two mutually coherent beams of light (e.g., a primary beam of light and an interfering beam of light). The interfering beam of light may be configured to create interference with respect to the primary beam of light. The imaging system may be configured to capture a plurality of intermediate images of the sample during the illumination, and to generate a final image of the sample based on the plurality of intermediate images. The interference caused by the two beams of light may enable the imaging system to reject out of focus blur based on detection of whether fluorescence emissions from the sample being imaged fluctuate or remain static upon changing the lateral position of the interference pattern.

In a first implementation, a method for imaging a sample is disclosed. The method includes illuminating a sample using a primary beam of light and an interfering beam of light. The interfering beam of light may be configured to create interference with respect to the primary beam of light. The method further includes capturing a plurality of intermediate images of the sample during the illuminating, and generating a final image of the sample based on the plurality of intermediate images. In an embodiment, the interference created by the two beams of light may enable out of focus blur to be rejected during construction of the final image based on detection of whether fluorescence emissions from the sample, as reflected in the plurality of intermediate images, fluctuate or remain static upon changing the lateral position of the interference pattern.

In a second implementation, a non-transitory computer-readable medium storing instructions that, when executed by one or more processors, cause the one or more processors to perform operations for imaging a sample is disclosed. The operations may include illuminating a sample using a primary beam of light and an interfering beam of light. The interfering beam of light may be configured to create interference with respect to the primary beam of light. The operations may further include capturing a plurality of intermediate images of the sample during the illumination, and generating a final image of the sample based on the plurality of intermediate images. In an embodiment, the interference created by the two beams of light may enable out of focus blur to be rejected during construction of the final image based on detection of whether fluorescence emissions from the sample, as reflected in the plurality of intermediate images, fluctuate or remain static upon changing the lateral position of the interference pattern.

In a third implementation, an imaging system configured to image a sample is disclosed. The imaging system includes: a light source configured to generate a primary beam of light and an interfering beam of light; one or more mirrors configured to direct the primary beam of light and the interfering beam of light toward a sample to be imaged; one or more cameras configured to capture a plurality of intermediate images of the sample during the illumination; and one or more processors configured to generate a final image of the sample based on the plurality of intermediate images. In an embodiment, the interfering beam of light and the primary beam illuminate the sample such that evanescence fields caused by the illumination create interference. In an embodiment, the illumination angles may be adjusted such that the primary and interfering beam illuminate the sample at a shallow angle and produce interference. In an embodiment, the interference created by the two beams of light may enable out of focus blur to be rejected during construction of the final image based on detection of whether fluorescence emissions from the sample, as reflected in the plurality of intermediate images, fluctuate or remain static upon changing the lateral position of the interference pattern.

The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage includes 0.1, 1, 5, and 10%.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
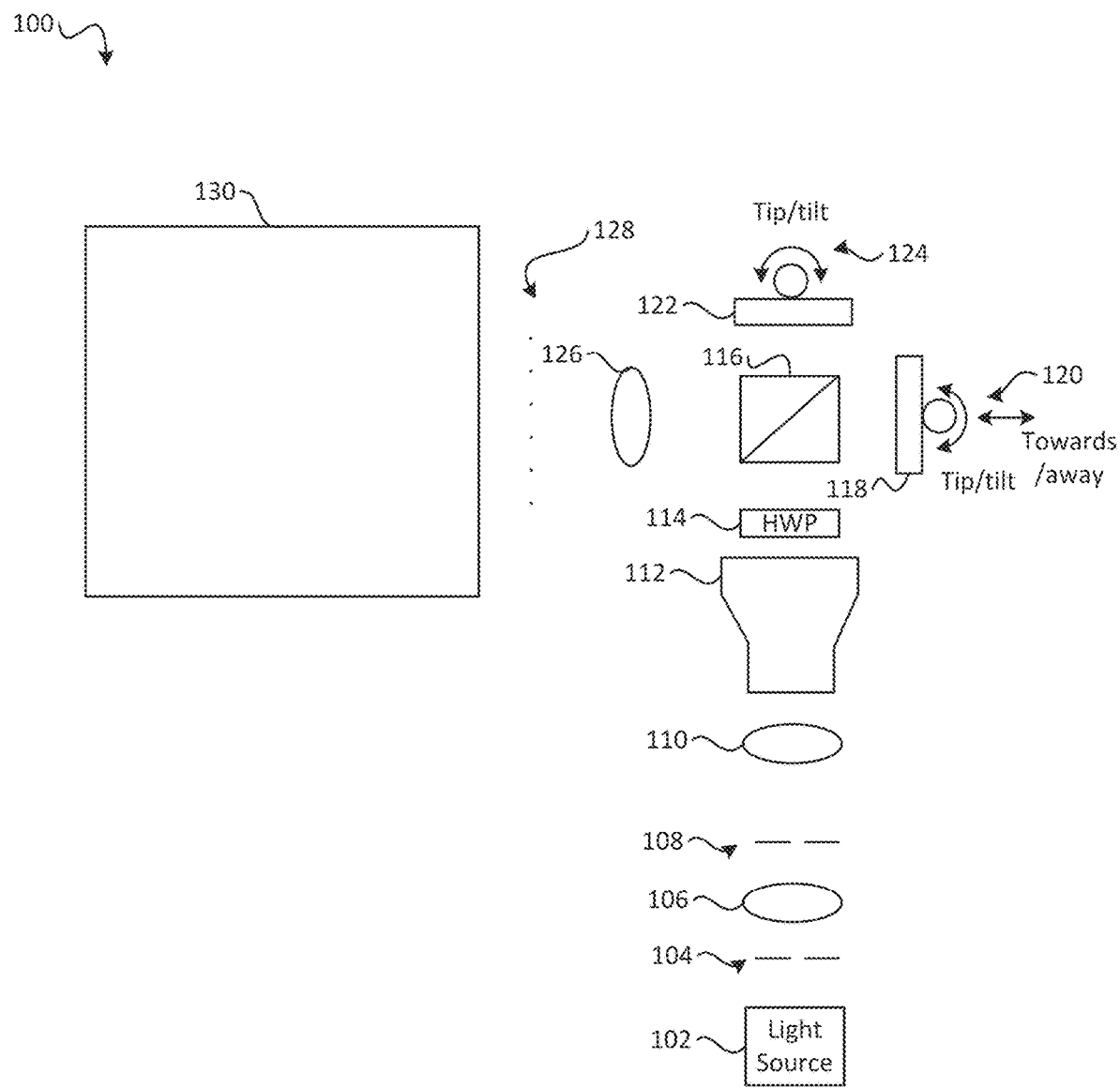
FIG. 1 is a block diagram of an imaging system configured according to embodiments.

The present disclosure is generally related to microscope imaging systems, and more particularly to improved structured illumination TIRF microscopy and HILO imaging techniques that improve rejection of out of focus blur and oblique illumination. Referring to FIG. 1, a block diagram of an imaging system configured according to embodiments is shown as an imaging system 100. In an embodiment, the imaging system 100 may be a structured total internal reflection fluorescence (sTIRF) imaging system. In an additional or alternative embodiment, the imaging system 100 may be a structure illumination HILO (sHILO) imaging system. In still another additional or alternative embodiment, the imaging system 100 may be configured to operate as both a sTIRF imaging and a sHILO imaging system. As shown in FIG. 1, the imaging system 100 includes a light source 102, a mechanical shutter 104, a lens 106, a pinhole 108, a lens 110, a beam expander 112, a half waveplate (HWP) 114, a beam splitter 116, a mirror 118, a actuator 120, a mirror 122, a actuator 124, a tube lens 126, and a microscope 130. The microscope 130 may be configured to capture image data associated with fluorescence emission detected at an image plane (e.g., image plane 232 of FIG. 2) in response to illumination of a sample, as described in more detail below. In an embodiment, the actuators 120, 124 may comprise piezoelectric actuators, galvanometric actuators, other types electro-mechanical actuators, or a combination thereof. In an embodiment, fluorescence light may be separated before being provided to a tube lens and being detected by a camera, as described in more detail with reference to FIG. 2. In an embodiment, a dichroic mirror may be used to separate the fluorescence light, as shown in FIG. 2 described below.

In an embodiment, the light source 102 may be a laser light source. For example, the light source 102 may be a solid state continuous wave (CW) laser. The mechanical shutter 104 may be configured to pass the beam of light from the light source 102 during operation of the imaging system 100, and to dump the beam of light when desired during operation of the imaging system 100. It is noted that although FIG. 1 illustrates the shutter as a mechanical shutter, in additional or alternative embodiments, other types of shutter device may be used, depending on the particular configuration of the imaging system 100. After exiting the mechanical shutter 104, the beam of light may pass through the lens 106 and then cleaned up by the pinhole 108 prior to passing through lens 110 and expansion by the beam expander 112. In an embodiment, the beam expander 112 may be expand the beam up to 5 times. After expansion of the beam of light by the beam expander 112, the expanded beam of light may be provided to the half waveplate (HWP) 114, which may be configured to control polarization of the beam of light. Subsequently, the beam of light may be provided to the beam splitter 116, which produces two beams of light that may be focused onto an aperture plane 128 of the microscope 130. In an embodiment, the beam splitter 116, the mirror 118, the actuator 120, the mirror 122, and the actuator 124 may be part of a Michelson type interferometer, and the two beams of light may comprise a primary beam of light and an interfering beam of light, as described in more detail below. Phase stepping may be achieved by moving one of the mirrors 118, 122 using the actuators 120, 124, respectively and/or moving the beam splitter 116 using an actuator. In an embodiment, the microscope 130 may include a detection objective (not shown in FIG. 1) communicatively coupled to one or more cameras (not shown in FIG. 1) that may be configured to capture one or more images of fluorescence emitted by a sample illuminated by the primary beam of light and the interfering beam of light, as described in more detail below with reference to FIGS. 2-9.

Figure 2:
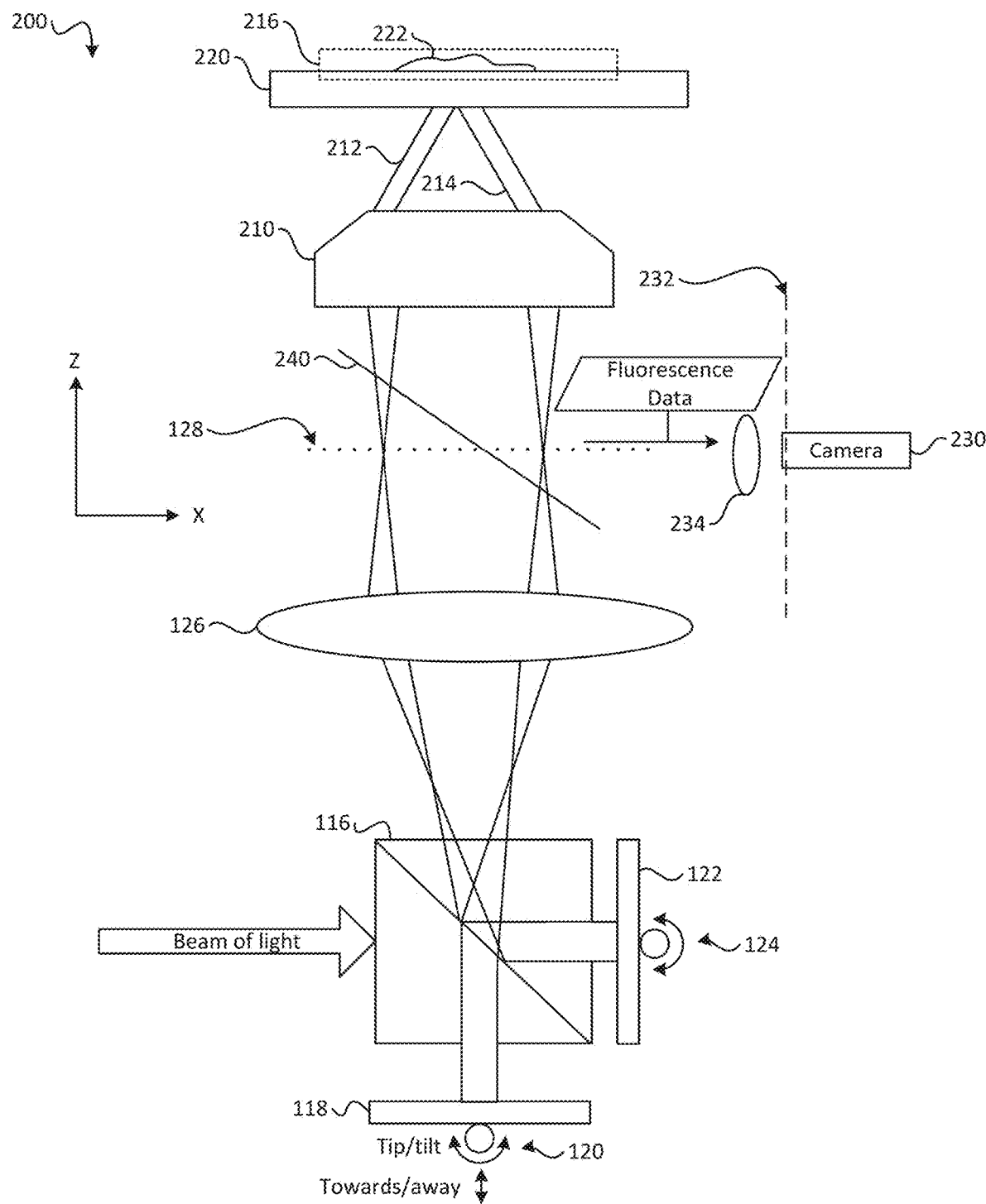
FIG. 2 is a block diagram illustrating additional aspects of imaging systems configured according to embodiments.

Referring to FIG. 2, a block diagram illustrating additional aspects of a sTIRF imaging system configured according to embodiments is shown. As shown in FIG. 2, the beam of light generated by the light source 102 may be provided (e.g., after being passed through the mechanical shutter 104, the lens 106, the pinhole 108, the lens 110, the beam expander 112, and the HWP 114) to the beam splitter 116, and a first portion of the beam may be provided to the mirror 118 while a second portion of the beam may be provided to the mirror 122. The mirrors 118 and 122 may reflect the light back to the beam splitter 116, which directs the light to the tube lens 126. The tube lens 126 focuses the beams of light into the aperture plane 128 and provides them to an objective 210. The objective 210 may illuminate a sample 122 using the two beams of light, where a first beam of the two beams of light provides a primary beam of light 212 and a second beam of the two beams of light provides an interfering beam of light 214. As shown in FIG. 2, the primary beam of light 212 and the interfering beam of light 214 may illuminate the sample 222 disposed on a coverslip 220. The illumination may create one or more evanescent fields 216. As described in more detail below with reference to FIGS. 3A, 3B, and 4), an incidence angle and azimuthal orientation of each beam can be controlled using the mirrors 118, 122 and the actuators 120, 124. As shown in FIG. 1, the actuators 120, 124 may be configured to adjust the tip and tilt angular freedom (e.g., the curved arrows), and at least one of the mirrors may be configured to move its corresponding mirror towards the beam splitter 116, as indicated by the straight arrow proximate the actuator 120 in FIG. 1.

Fluorescence light may be collected by the objective 210 and may be used to generate one or more images of the sample. For example, in an embodiment, the collected fluorescence light (e.g., fluorescence data) may be imaged via a side port of the objective 210 onto a camera 230. For example, a dichroic mirror 240 may direct the detected fluorescence light to the camera 230. A tube lens 234 may be used to image the fluorescence light onto an image plane 232 of the camera 230 for generating images of the illuminated sample. In an embodiment, the camera 230 may be a scientific complementary metal-oxide-semiconductor (CMOS) camera. It is noted that traditional TIRF microscopes utilize a single beam of light, which may correspond to the primary beam of light 212, whereas the imaging system 100 of embodiments utilizes the primary beam of light 212 and the interfering beam of light 214. As described in more detail below, by providing both the primary beam of light and the interfering beam of light 214, the imaging system 100 of embodiments may be enabled to reject out of focus blur, resulting in higher contrast images than would be obtained using traditional TIRF microscopes, as described in more detail below.

In an embodiment, the imaging system 100 of FIGS. 1 and 2 may be configured to operate under the control of a computing system (not shown in FIGS. 1 and 2). For example, the computing system may include one or more processors configured to control the operations of the imaging system 100. In an embodiment, the one or more processors may execute instructions stored in a memory of the computing system, where the instructions, when executed by the processor, cause the processor to perform the operations described in connection with the imaging system 100 with reference to FIGS. 1-9, and may use the imaging techniques briefly described above with reference to FIGS. 1 and 2 to generate images of the sample 222 based on fluorescence light detected during illumination of the sample 222 by the primary beam of light 212 and the interfering beam of light 214, as described in more detail below. In an additional or alternative embodiment, the processor may include one or more application specific integrated circuits (ASICs), a field programmable gate array (FPGA), circuitry, or other hardware and/or software components configured to perform the operations described in connection with the imaging system 100 with reference to FIGS. 1-9.

During operation of the imaging system 100 of FIGS. 1 and 2, the interference caused by the interfering beam 214 may generate an interference pattern (i.e., modulation of the illumination light by forming a standing wave), and the configuration of the imaging system 100 may be configured to superimpose the interference pattern onto the sample. In an embodiment, the interference pattern may form a stripe pattern, which may be allow the imaging system 100 to determine whether detected fluorescence corresponds to in focus portions of the sample, or out of focus blur. In particular, the interference pattern, when projected onto the sample, may enable the imaging system 100 to encode what is in focus and what is not in focus. When the interference pattern is moved (e.g., by shifting the standing wave pattern), the fluorescence light corresponding to the in focus portions of the sample may fluctuate in intensity and the out of focus blur may remain stationary. This may enable the imaging system 100 to mathematically separate the fluorescence light that fluctuates in intensity from the fluorescence light that having a stationary intensity, thereby allowing the imaging system 100 to compute what is portions of the sample are in focus and what portions of the sample correspond to out of focus blur. In an embodiment, line spacing of the interference pattern may be adjusted by adjusting an azimuthal orientation, described in more detail below, of the two evanescent fields (e.g., the evanescent field of the primary beam of light and the evanescent field corresponding to the interfering beam of light). In the images described below with reference to FIGS. 5-7, the line spacing was set to 500-550 nm during imaging of the samples, which corresponds to roughly twice the FHWM of an experimentally measured PSF for green emission. Assuming 488 nm and an incidence angle of 66 degrees, this results in an azimuthal orientation of 44-55 degrees for 500 nm and 550 nm line spacing, respectively.

To image the sample, the imaging system 100 may capture a plurality of intermediate images of the sample. In an embodiment, the plurality of intermediate images may include the interference pattern. Image data associated with the plurality of intermediate images may be processed to remove out of focus blur in the manner described above. That is to say, the imaging system 100 may generated a final image of the sample from a set of intermediate images by omitting image data associated with portions of the intermediate images having a stationary fluorescence intensity across the set of intermediate images and including image data associated with portions of the intermediate images having a fluctuating fluorescence light intensity. This allows the imaging system 100 to generate high contrast images of a sample, as described and illustrated below with reference to FIGS. 5-7.

Figure 3A:
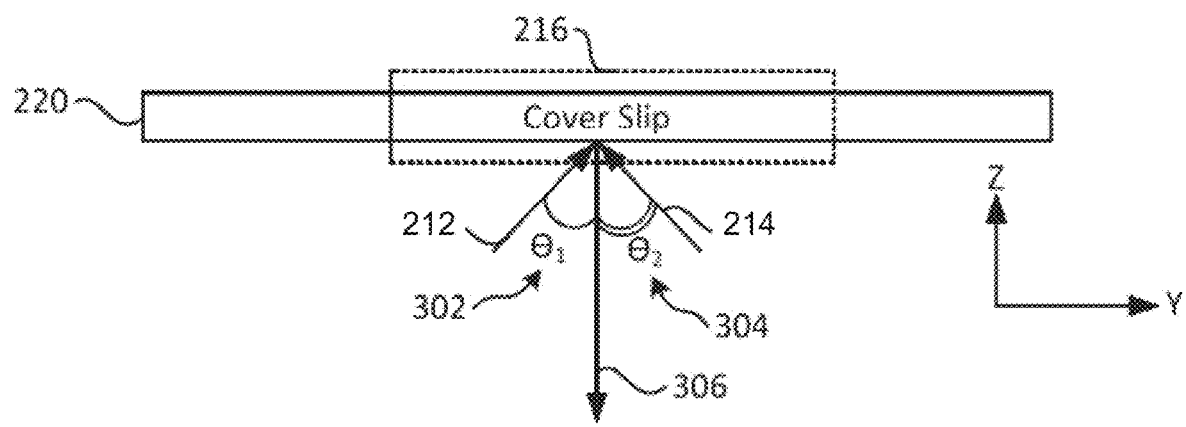
FIG. 3A is a block diagram illustrating aspects associated with incidence angles for illuminating of a sample by a primary beam of light and a secondary beam of light according to embodiments.
Figure 3B:
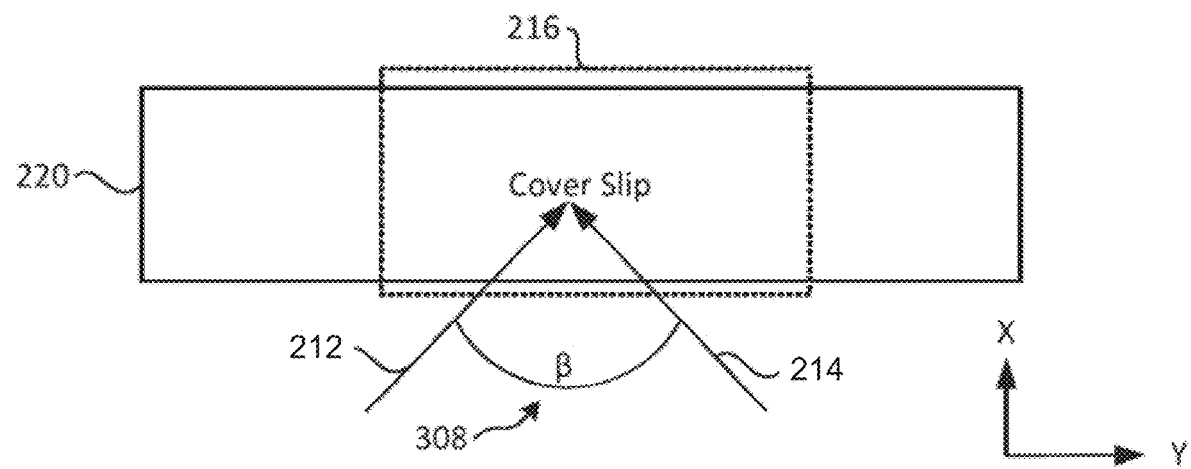
FIG. 3B is a block diagram illustrating aspects associated with an azimuthal orientation of a primary beam of light and an interfering beam of light during illumination of a sample by an imaging system according to embodiments.

Referring to FIG. 3A, a block diagram illustrating aspects associated with incidence angles for illuminating of a sample by a primary beam of light and a secondary beam of light according to embodiments is shown. As shown in FIG. 3A, the primary beam of light 212 may illuminates the sample at an incidence angle $\theta_1$, and the interfering beam of light 214 may illuminate the sample at a second angle $\theta_2$. In an embodiment, $\theta_1$ and $\theta_2$ may be between 62 to 72 degrees for sTIRF illumination, and between 59-62 degrees for oblique illumination (sHILO) relative to a normal 306 to the sample. Referring to FIG. 3B, a block diagram illustrating aspects associated with an azimuthal orientation of a primary beam of light and an interfering beam of light during illumination of a sample by a sTIRF imaging system according to embodiments is shown. As shown in FIG. 3B, the primary beam of light 212 and the interfering beam of light 214 may have an azimuthal orientation β during illumination of the sample. In an embodiment, the azimuthal orientation β may be approximately 40 degrees. In an embodiment, the incidence angles $\theta_1$ 302, $\theta_2$ 304, and the azimuthal orientation β 308 associated with the primary beam of light 212 and interfering beam of light 214 may be controlled using the mirrors 118, 122, either manually or automatically using the actuators 120, 124. In an additional or alternative embodiment, one or more of the mirrors 118, 122 may be coupled to an actuator controlled via operations of the computing system described above with reference to FIGS. 1 and 2.

Figure 4:
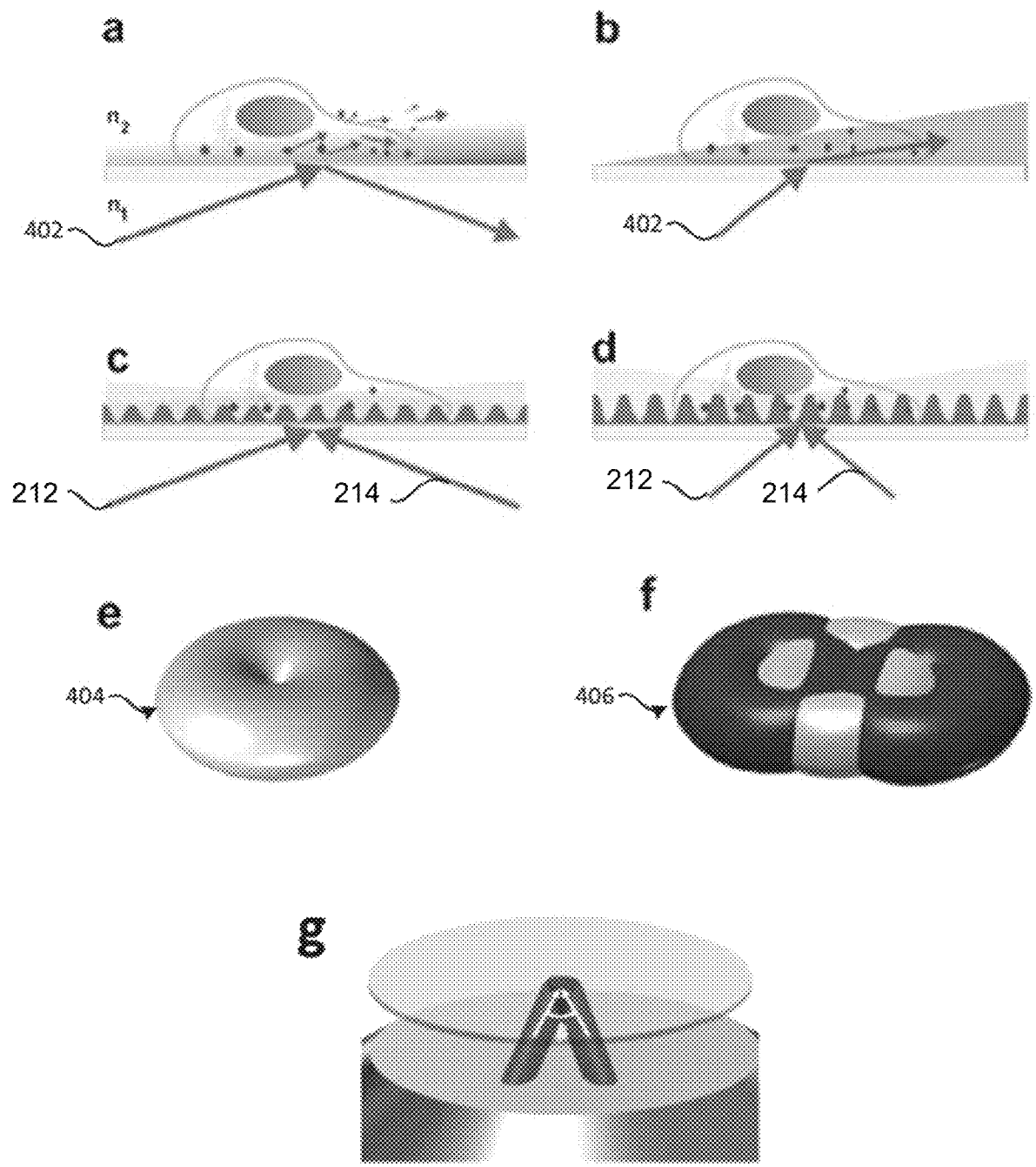
FIG. 4 is a series of diagrams illustrating advantageous aspects of imaging systems configured according to embodiments.

Referring to FIG. 4, a series of diagrams illustrating advantageous aspects of sTIRF imaging systems configured according to embodiments over traditional TIRF microscopes is shown. As briefly described above, the evanescent fields employed in TIRF microscopy are in practice often compromised by light scattering. As schematically shown in FIG. 4 on the left hand side at "a," using traditional TIRF microscope imaging techniques, an evanescent field (travelling from left to right in FIG. 4 at "a") undergoes scattering by cellular features, resulting in photons that can propagate into the far field. This causes fluorescence to be excited well outside the depth of focus of the detection objective, resulting in out of focus blur. Since fluorescence light is detected in a widefield format, which features a missing cone in its optical transfer function (OTF), as shown in FIG. 4, at 404 in image "e", out-of-focus blur cannot be rejected using traditional TIRF techniques. In densely labeled cells, such out-of-focus blur can significantly reduce the contrast of a final TIRF image and hamper image analysis.

In contrast to traditional TIRF techniques, sTIRF imaging systems configured according to embodiments, such as the imaging system 100 described above with respect to FIGS. 1-3, operate to suppress out-of-focus light via structured illumination. In an embodiment, this may be accomplished by using a spatial frequency of half the diffraction limit such that spatial frequency information may be encoded that can effectively fill the missing cone, as shown at FIG. 4 at image "c," where the sample is illuminated by a primary beam of light and an interfering beam of light, as described above. As a result, imaging systems of embodiments provide robust blur rejection. It is noted that while FIG. 4 at image "g" shows a three-dimensional OTF 406 that overcomes the missing cone problem in accordance with embodiments, the benefit of having no missing cone applies to two-dimensional image slices as well, such as two-dimensional image slices acquired with the imaging system 100 described above. In FIG. 4, image "b" depicts a traditional HILO technique using a single beam of light, and image "d" depicts a sHILO imaging technique according to embodiments whereby the sample is illuminated by a primary beam of light 212 and an interfering beam of light 214, which may provide similar benefits to those described above relative to images "a" and "c" of FIG. 4.

An imaging system was constructed according to the configuration illustrated in FIGS. 1 and 2, and final images were reconstructed by capturing three images having varying pattern phase and the different information bands were extracted computationally, as described in more detail below with reference to FIGS. 8 and 9. It is noted that deconvolution of the data was not necessary using the algorithm implemented for the constructed sTIRF imaging system, which allows a fair comparison to conventional TIRF data. However, in some embodiments, deconvolution of the data may be utilized depending on the particular algorithm implemented to reconstructing the final images. Additional images providing a comparison of traditional TIRF imaging techniques and sTIRF imaging techniques are described below with reference to FIG. 12. A comparison of traditional HILO imaging techniques and sHILO imaging techniques is described below with reference to FIG. 13.

Figure 5:
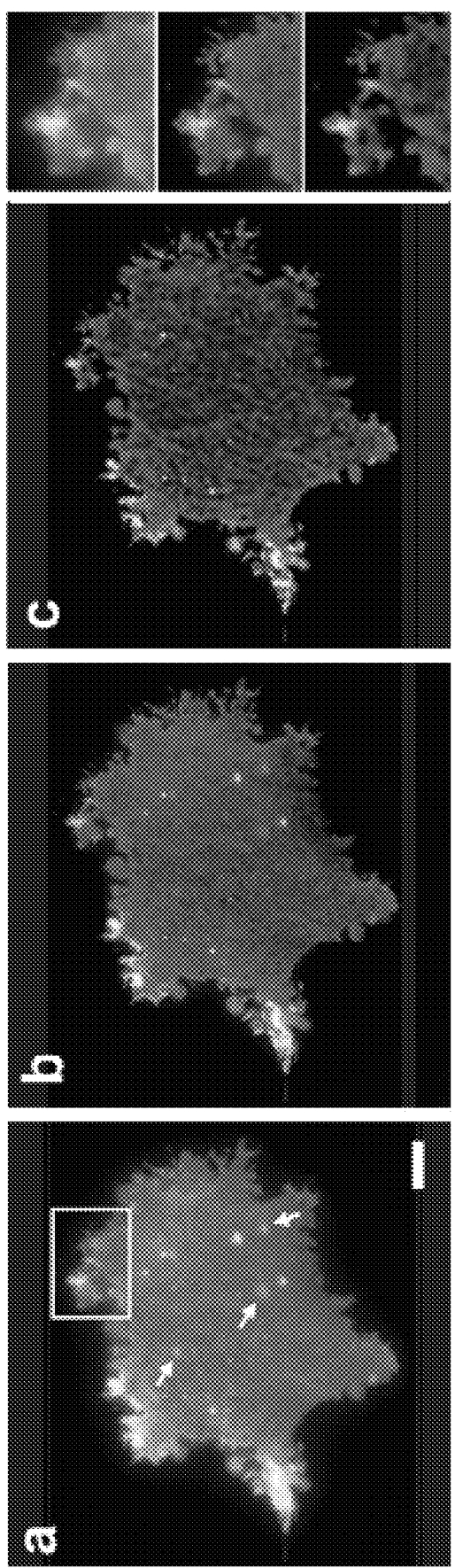
FIG. 5 shows various images illustrating aspects of improvements provided by a imaging systems configured according to embodiments.

Referring to FIG. 5, various images illustrating aspects of improvements provided by a sTIRF imaging system configured according to embodiments are shown. The images shown in FIG. 5 depict an MV3 cancer cell labeled with AKT-PH-GFP, a biosensor for PI3kinase activity were imaged. In FIG. 5, "a" represents an image of the cell generated using conventional TIRF, "b" represents an image of the cell generated using linearly deconvolved TIRF, and "c" represents an image of the cell generated using an sTIRF imaging system configured according to embodiments of the present disclosure. As is apparent in FIG. 5, the sTIRF image (e.g., image "c") shows a striking reduction in background level inside the cell and cell edges appear much sharper when compared to both the conventional TIRF image (e.g., image "a") and the linearly deconvolved TIRF image (e.g., image "b").

Further, the linearly deconvolved TIRF image (e.g., image "b") and the sTIRF image (e.g., image "c") reveal fine intensity variations on the membrane, presumably representing the membrane topology, which are not visible in the normal TIRF image (e.g., image "a"). In addition several bright and also blurred spots inside the cell (three are indicated with arrows in image "a"), which may represent vesicles filled with the biosensor inside the cytosol, are clearly visible in the conventional TIRF image (e.g., image "a") and the deconvolved TIRF image (e.g., image "b"). These bright out-of-focus particles are suppressed in the sTIRF image (e.g., image "c") owing to the increased optical sectioning capability provided by sTIRF imaging systems configured according to embodiments. Thus, although linear deconvolution may be used to increase the contrast of conventional TIRF images, it fails to remove out-of-focus blur, which is also evidenced in the residual blur around the edges, which can be seen in the insets on the right hand side of FIG. 5, where the top inset represents the region bounded by the box in image "a," the middle inset corresponds to the same region in the deconvolved TIRF image (e.g., image "b"), and the bottom inset corresponds to the same region in the sTIRF image (e.g., image "c").

Figure 6:
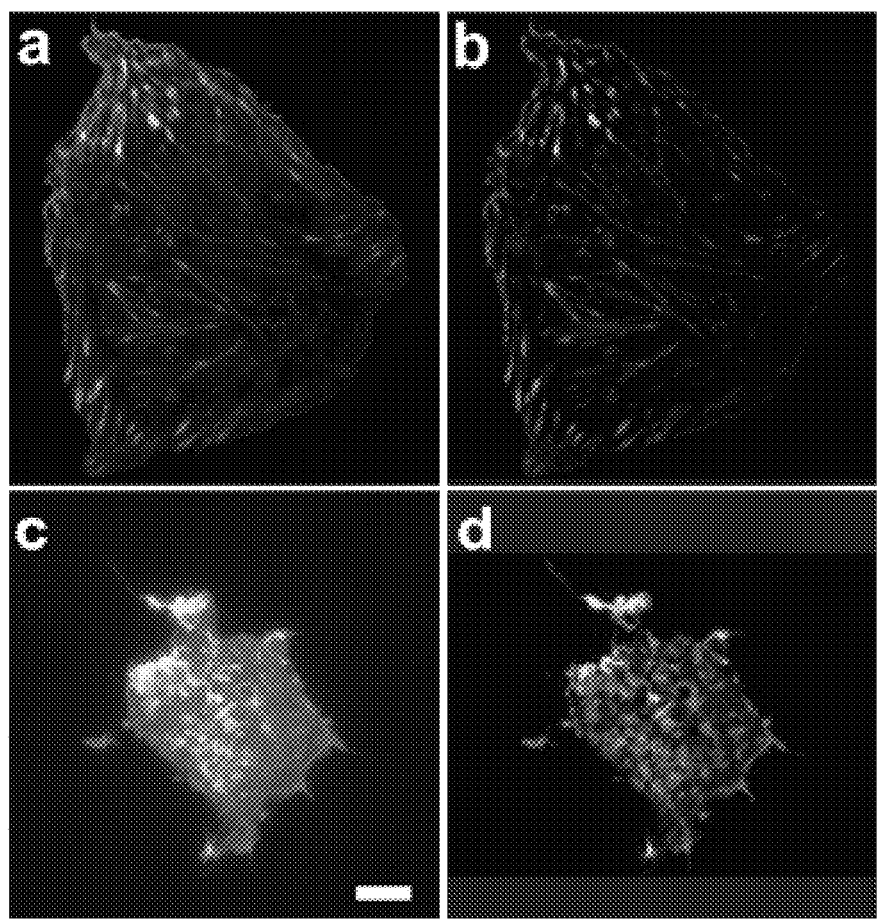
FIG. 6 shows various images illustrating additional aspects of improvements provided by an imaging system configured according to embodiments.

The biosensor that is imaged in FIG. 5 is an extreme case, as the entire cytosol contains fluorophores, but it nevertheless represents an important imaging application. However, sTIRF imaging systems configured according to embodiments also improve the contrast on samples with less abundant labeling. For example, and referring to FIG. 6, various images illustrating additional aspects of improvements provided by a sTIRF imaging system configured according to embodiments are shown. In FIG. 6, various images illustrating additional aspects of improvements provided by a sTIRF imaging system configured according to embodiments are shown. In FIG. 6, the various images show cells labeled with tractin GFP. The images shown in FIG. 6 were captured using conventional TIRF (e.g., image "a" and image "c") and sTIRF (e.g., image "b" and image "d", respectively. Bright spots represent focal adhesions from which stress fibers protrude to the inside of the cell. As shown in FIG. 6, the sTIRF image (e.g., image "b") suppresses blur around dense focal adhesion clusters in the top part of the RPE cell more effectively than conventional TIRF (e.g., image "a"). In FIG. 6, images "c" and "d" show an AG73 Ewing Sarcoma cell, labeled also with tractin GFP. This particular cell appears to have adhered tightly to the glass coverslips and a dense actin network is visible, along with some image blur in the conventional TIRF image (e.g., image "c"). The sTIRF image (e.g., image "d") achieves a much higher image contrast and also the cell boundary is much more clearly defined. Further, the improved optical sectioning of sTIRF reveals that there is a gap between the main body and the large protrusion at the top, which is not resolved in the conventional image (e.g., image "c").

Figure 7:
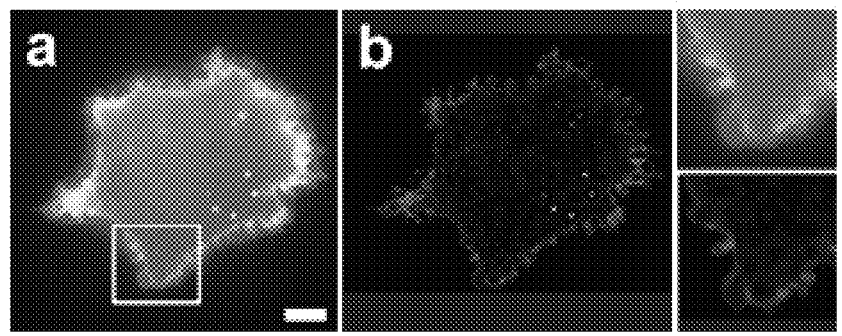
FIG. 7 shows images illustrating aspects of imaging a sample with oblique illumination using an imaging system configured according to embodiments.

To image beyond the plasma membrane, the incidence angle of the two beams of light (e.g., the primary beam of light and the interfering beam of light described above with reference to FIGS. 1 and 2) may be adjusted slightly below the critical angle, resulting in oblique illumination. Referring to FIG. 7, images illustrating aspects of imaging a sample with oblique illumination using a sTIRF imaging system configured according to embodiments are shown. In FIG. 7, image "a" shows a conventional TIRF image of the same cell depicted in the various images of FIG. 5, but obtained with oblique illumination. As shown at image "a" of FIG. 7, using oblique illumination, membrane structures on the periphery become visible at the price of drastically increased amounts of out-of-focus blur. This has to be expected, as the excitation is no longer limited by the exponential decay of an evanescent field. In contrast, the image obtained by combining oblique illumination with structured illumination using a sTIRF imaging system configured according to embodiments robustly rejects out-of-focus blur resulting in drastically increased image contrast. For example, as the insets on the right side of FIG. 7 illustrate, the sTIRF image inset (bottom inset on the right side of FIG. 7) reveals that the biosensor is localized to the membrane in small protrusions (also known as blebs), an important detail that is lost in the conventional oblique illumination image (top inset on the right side of FIG. 7).

From the foregoing it is shown that sTIRF imaging systems according to embodiments excel at imaging densely labeled samples and may also improve imaging of samples that strongly scatter the evanescent field. Additionally, the increased optical sectioning may be beneficial to a wide range of samples, including sparsely labeled samples and oblique illumination schemes. In the images depicted in FIGS. 5-7, it has been shown that images generated by a sTIRF imaging system configured according to embodiments of the present disclosure provide improvements in the field of TIRF-type imaging systems. In particular, sTIRF imaging systems configured according to embodiments provide a robust imaging system that greatly increases the rejection of out of focus blur compared to traditional TIRF imaging technologies and techniques, resulting in high contrast images that may provide greater detail (e.g., the stress fibers protrude to the inside of the cell shown in FIG. 6 at image "b" or the blebs illustrated in the bottom inset on the right side of FIG. 7) with respect to the sample being imaged.

It is noted that azimuthal rotation of the laser beam, also known as ring-TIRF, has been reported to reduce spurious interference patterns in TIRF microscopy and thereby increasing the illumination uniformity. However, ring-TIRF cannot suppress the scattering of the evanescent field and resulting out-of-focus fluorescence. In contrast, while sTIRF imaging systems according to embodiments may suppress out-of-focus blur, as described and illustrated above, it may still be prone to spurious interference artefacts, as the two beams of light are mutually coherent. There is currently no easy way to combine the advantages of both structured illumination and the temporally incoherent illumination from many directions.

Figure 8:
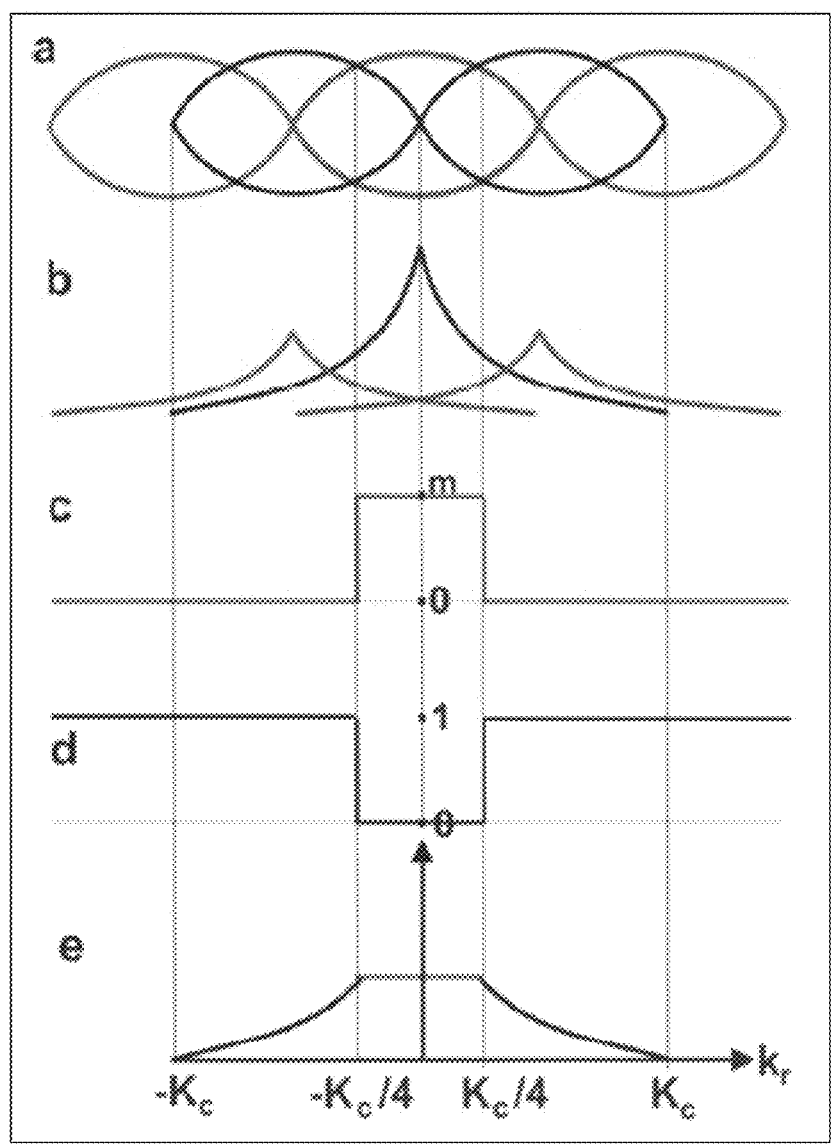
FIG. 8 is a diagram illustrating exemplary aspects characterizing aspects of an optical transfer function (OTF) for use in an imaging system configured according to embodiments.
Figure 9:
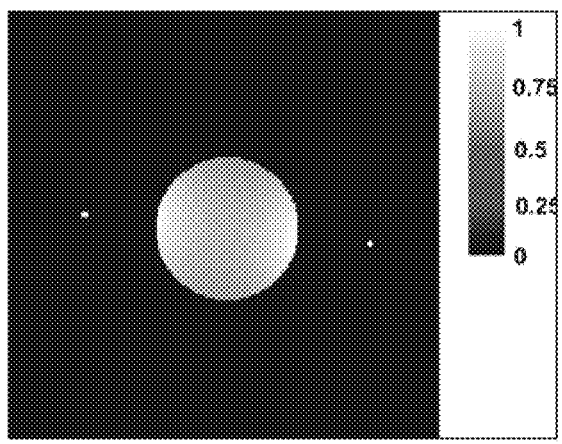
FIG. 9 is an image illustrating an experimentally measured OTF that may be used to estimate a combined transfer function.

Referring to FIG. 8, a diagram illustrating exemplary aspects characterizing aspects of an optical transfer function (OTF) for us in an imaging system configured according to embodiments is shown. Images created according to embodiments may be reconstructed in Fourier space. Structured illumination gives rise to the following spectral information: one object spectrum that is identical with standard widefield microscopy, which is referred to as the DC band, and two spectral copies that are shifted by + and − the illumination pattern vector (whose magnitude equals to the pattern frequency) in respect to the origin of reciprocal space. These shifted spectral copies (e.g., the two sidebands) contain Fourier components that may be used to fill the missing cone region (e.g., as briefly described with reference to FIG. 4 at "b") and are here referred to as sidebands. Stated another way, the two sidebands contain low frequency Fourier components that may be acquired with high optical sectioning strength and may replace those Fourier components in the DC band that have been transferred with no sectioning strength (e.g., due to the missing cone).

The illumination parameters (pattern frequency and phase steps) were measured directly from the raw data by analyzing the Fourier components of the illumination pattern. This is possible since the illumination pattern frequency is half the diffraction limit and hence is transferred by the OTF with sufficient strength to be visible (e.g., such that its Fourier components show up as distinct peaks in reciprocal space.). Using the relative phase steps between the three images, the DC band and the two frequency shifted sidebands were reconstructed pixel per pixel by solving a linear equation system. The two reconstructed sidebands were then shifted numerically to their proper place in Fourier space. In a patch around the origin of reciprocal space, the absolute phase angle between the DC band and sidebands was determined and the angle difference was multiplied on the sidebands. The large overlap between the different bands in sTIRF enables much greater robustness.

The object spectrum is reconstructed in 2D Fourier space as schematically sketched in FIG. 8 at (a)-(e). Within a circle of $K_c/4$, with $K_c$ being the cut-off frequency of the OTF, only the sum of the two sidebands is used, with the corresponding weighting mask shown in (c). In an embodiment, $K_c/4$ may be defined as half the frequency of the chosen interference pattern. Outside of this circle, only the Fourier components of the DC band were used. The corresponding weighting mask is shown in below at (d).

Theoretically, at a spectral radius of $K_c/4$, both the DC band and the sidebands should have the same optical sectioning strength and hence the same Fourier components. A thin annulus centered around $K_c/4$ may be used to measure the relative strength of the DC band and the summed sidebands. The resulting scalar scaling factor (m) may then be multiplied on the sideband components to equalize their strength to the DC band. Thereby the final object spectrum, schematically shown in (e) of FIG. 8, has a smooth transition at $K_c/4$ from the sideband components to the tail of the DC band. A reconstructed image may then be obtained by an inverse fast Fourier transform of the assembled and scaled object spectrum. No apodization mask or deconvolution was applied.

It is noted that by adding the two sidebands together, a relatively uniform transfer function within the circle of a radius of $K_c/4$ results. This is shown in FIG. 9, which is an image illustrating an experimentally measured OTF that may be used to estimate a combined transfer function. To obtain the OTF for each sideband, a raw OTF was centered on the corresponding peak of the illumination pattern, which is the center of each sideband. The two shifted OTFs were then summed within a circle of $K_c/4$. The relative uniformity of the combined OTF within this circle is due to the fact that the individual transfer functions at the corresponding position are essentially wedge shaped, but mirrored to each other.

The experimentally measured and shifted OTFs were used for deconvolution of the sideband components, but no gain was observed from this. The DC component was not deconvolved so as to not bias the perception of the images by gains coming from deconvolution in order to allow a fair comparison of conventional TIRF images to images generated according to embodiments of the present disclosure. Further, a reconstruction that does not require a deconvolution is simpler to handle experimentally (as no OTF is required) and also no Wiener constant, apodization function or other deconvolution parameter needs to be chosen, which makes the reconstruction less biased and more reproducible.

The two sidebands contain information that could be used to reconstruct sample information beyond the diffraction limit (up to a frequency of 1.5 $K_C$). However, the images of FIGS. 5-7 corresponding to sTIRF imaging systems of embodiments did not use this information to allow a more fair comparison to conventional TIRF images. The conventional TIRF image was obtained by using the reconstructed DC band of the reconstruction. For perfect 120 degrees phase steps, a widefield image can be simply obtained by summing all three images. However, the advantage of using the reconstructed DC band instead is that one can account for phase step errors.

Figure 10:
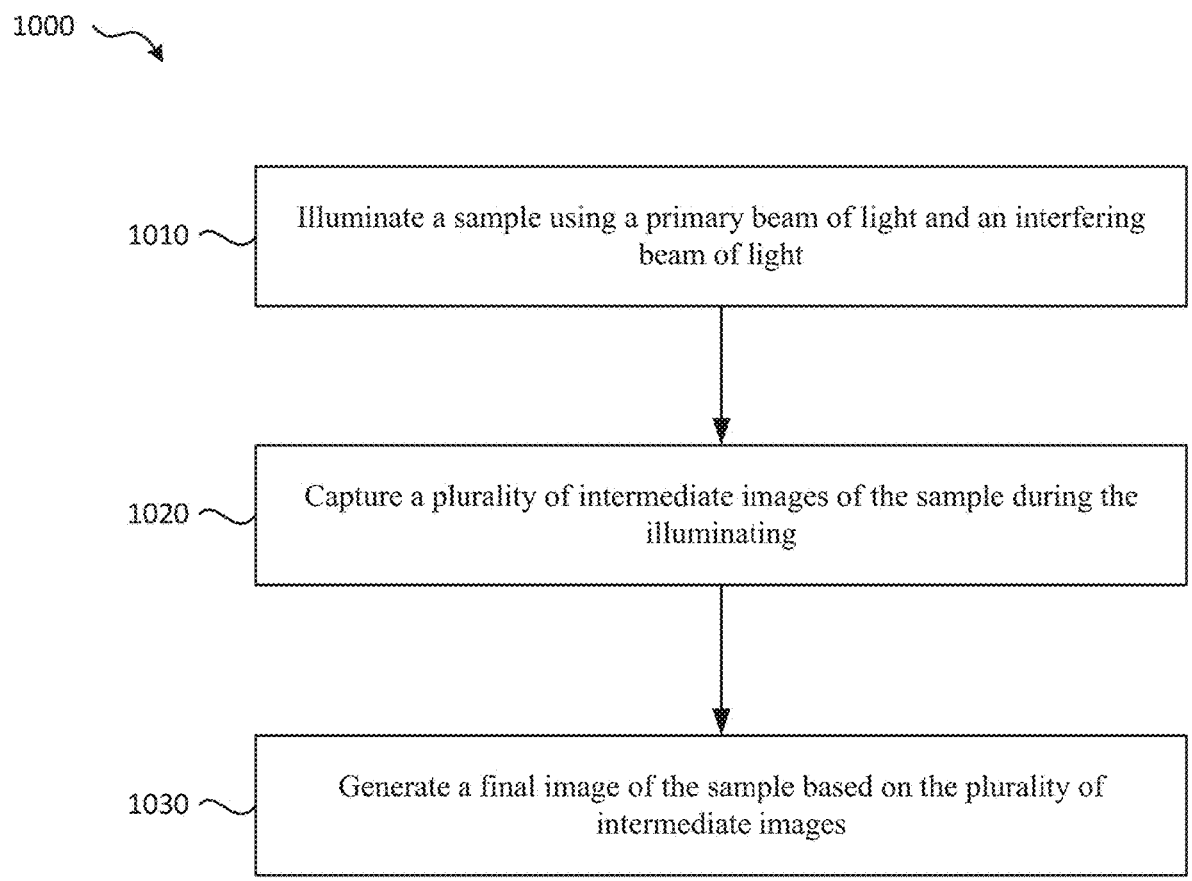
FIG. 10 is a flow diagram of a method for imaging a sample using an imaging system configured according to embodiments of the present disclosure.

FIG. 10 a flow diagram of a method for imaging a sample using a sTIRF imaging system configured according to embodiments of the present disclosure is shown as a method 1000. In an embodiment, the method 1000 may be used to generate one or more images of a sample using the imaging system 100 illustrated with reference to FIGS. 1 and 2. In an embodiment, the steps of the method 1000 may be stored as instructions stored in a memory (e.g., a memory of a computing device that controls the imaging system 100 of FIGS. 1 and 2). The instructions, when executed by one or more processors, may cause the one or more processors to perform operations for generating one or more images of a sample in accordance with embodiments of the present disclosure.

At 1010, the method includes illuminating a sample using a primary beam of light and an interfering beam of light. As described above, the interfering beam of light may be configured to create interference with respect to the primary beam of light. In an embodiment, the primary beam of light and the interfering beam of light may be created from a single beam of light generated by a light source (e.g., the light source 102 of FIG. 1). For example, the light source may generate a beam of light (e.g., a laser beam of light) that may be conditioned using one or more pinholes or irises, one or more lenses, a beam expander (e.g., the beam expander 112 of FIG. 1), a HWP (e.g., the HWP 114 of FIG. 1), and the like, and then provided to beam splitter (e.g., the beam splitter 116 of FIG. 1). In an embodiment, the beam splitter may comprise a Michelson type interferometer that includes one or more mirrors (e.g., the mirrors 118, 122 of FIGS. 1 and 2) and one or more piezo actuators (e.g., the piezo actuators 120, 124 of FIGS. 1 and 2). The HWP may control a polarization of the primary light beam and the interfering light beam.

As described above, and as illustrated in FIGS. 2-3B, the sample may disposed on a coverslip, and the primary beam of light and the interfering beam of light may illuminate the sample from beneath the coverslip. In an embodiment, the primary beam of light may illuminates the sample at an angle $\theta_1$, where the interfering beam of light illuminates the sample at a second angle $\theta_2$, as shown above in FIG. 3A. In an embodiment, $\theta_1$ and $\theta_2$ may between 62 to 72 degrees for sTIRF illumination, and between 59-62 degrees for oblique illumination (sHILO) relative to a normal to the sample. Additionally, the primary beam of light and the interfering beam of light have an azimuthal orientation β during illumination of the sample, as described above with reference to FIG. 3B. In an embodiment, the azimuthal orientation β may be approximately 40 degrees. In an embodiment, the angle and orientation of the primary beam of light and the interfering beam of light (e.g., $\theta_1$, $\theta_2$, and β) may be controlled using the mirrors and piezo actuators.

At 1020, the method 1000 includes capturing a plurality of intermediate images of the sample during the illuminating. In an embodiment, the plurality of intermediate images comprises at least three intermediate images for each final image. As described above, the plurality of intermediate images may comprise an interference pattern created by the interfering beam of light. In an embodiment, the plurality of intermediate images may comprise a representation of the interference pattern. In an embodiment, the representation of the interference pattern may appear in the plurality of intermediate images as a pattern of lines. In an embodiment, the method 1000 may include modulating at least one of the primary beam of light and the interfering beam of light to control a characteristic of the pattern of lines. The characteristic of the pattern of lines may comprise a line spacing, a line thickness, or a combination thereof.

At 1030, the method 1000 includes generating a final image of the sample based on the plurality of intermediate images. In an embodiment, generating the final image of the sample may comprise: detecting changes between each of the plurality of intermediate images based at least in part on the representation of the interference pattern; and generating the final image based on detected changes. In an embodiment, generating the final image based on the detected changes may comprise: omitting, from the final image, image components of the plurality of intermediate images that remain static (e.g., the intensity of fluorescence remains static), and including, in the final image, image components of the plurality of intermediate images that do change (e.g., the intensity of fluorescence changes).

Figure 11:
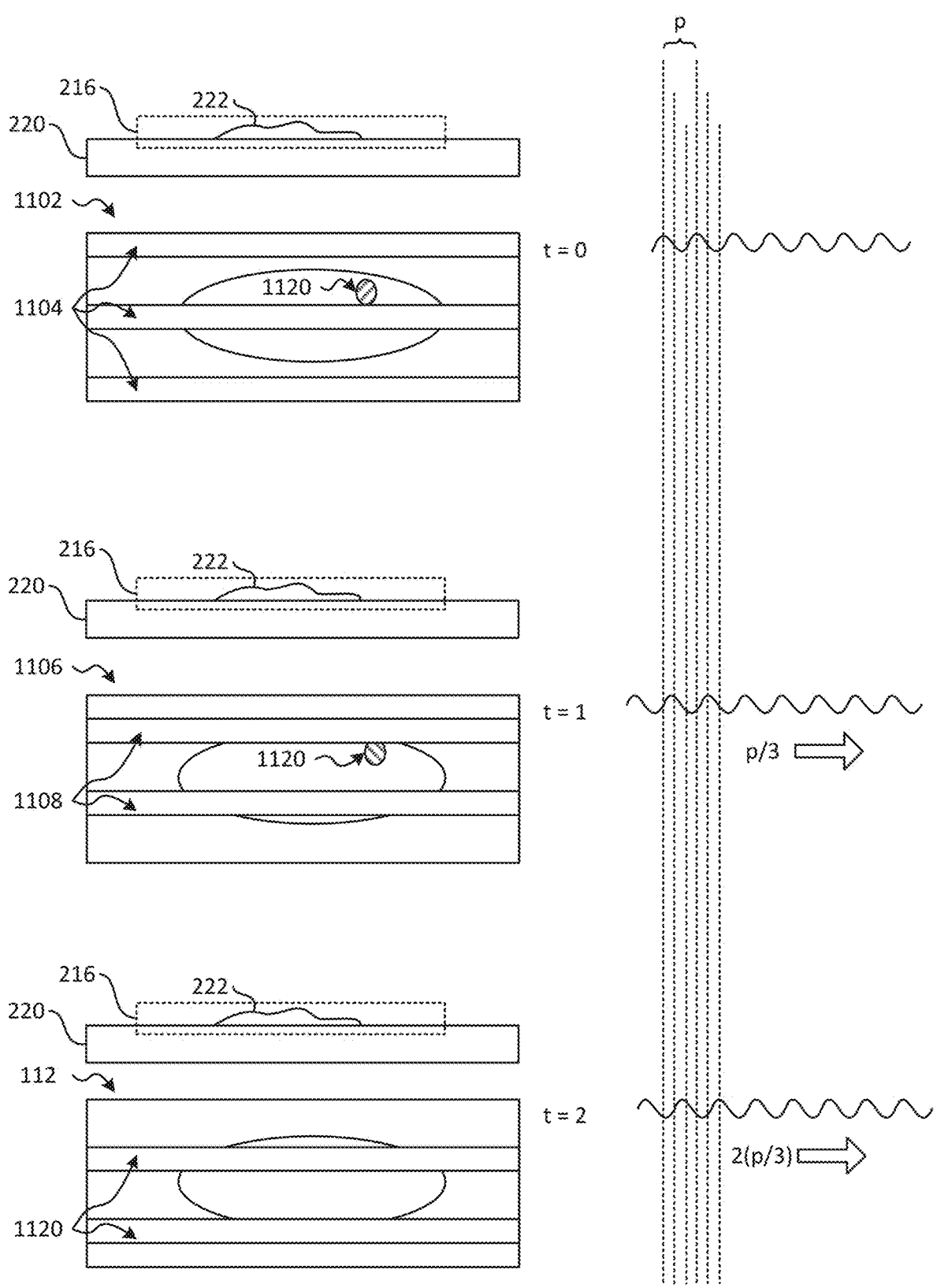
FIG. 11 is a block diagram illustrating a method for capturing a plurality of intermediate images of a sample using an imaging system configured according to embodiments.

Referring to FIG. 11, a block diagram illustrating a method for capturing a plurality of intermediate images of a sample using a sTIRF imaging system configured according to embodiments is shown. As shown in FIG. 11, the sample 222 of FIG. 2 may be placed on a coverslip 220 and evanescent field(s) 216 may be generated by the illumination of the sample. At a time t=0, a first intermediate image 1102 may be captured, and may include a first interference pattern 1104. At a time t=1, a second intermediate image 1106 may be captured, and may include a second interference pattern 1108. At a time t=2, a third intermediate image 1110 may be captured, and may include a second interference pattern 1112.

As explained above, the interference pattern may appear as a plurality of lines within the intermediate images captured by the sTIRF imaging of embodiments. As illustrated in FIG. 11, the interference pattern may appear at different positions within the intermediate images 1102, 1106, 1110. In an embodiment, shifting of the interference pattern may be controlled based on the period of the light used to illuminate the sample. For example, as shown on the right side of FIG. 11, at time t=0, the first intermediate image may be captured based on illumination of the sample 222, where the light has a period (p). At time t=1, the period (p) of the light may be shifted by 2(p/3), which results in a first corresponding shift in the interference pattern, as represented by the interference pattern 1108, and at time t=2, the period (p) of the light may be shifted by 2(p/3), which results in a second corresponding shift in the interference pattern, as represented by the interference pattern 1112. As a result of capturing the intermediate images 1102, 1106, 1110 using different shifts in the period (p) of the illumination light, the interference pattern is, in effect, swept across the sample such that the entire sample may be imaged. It is noted that the interference pattern may only be visible when the image is in focus. Thus, portions of the intermediate images that are not obstructed by the interference pattern are in focus.

As explained above, these intermediate images may then be stitched together and out of focus blur may be rejected by determining whether intensity of fluorescence light at different portions of the intermediate images remain constant (e.g., in focus) or change (e.g., out of focus). For example, as shown in FIG. 11, a portion 1120 of the intermediate image 1102 may have a first intensity of fluorescence light at time t=0, and may have a second intensity of fluorescence light at time t=1. When constructing the final image, the fluorescence light corresponding to the portion 1120 may be rejected or omitted as out of focus blur, thereby improving the contrast of the final image. It is noted that although FIG. 11 illustrates an embodiment where only three intermediate images are shown, in some embodiments, more than three intermediate images may be captured and used to generate the final image. Further, it is noted that an amount of shift for the period of the illumination light may correspond to the number of intermediate images to be captured. For example, if 4 intermediate images are to be captured, a first intermediate image may be captured with no shift, a second intermediate image may be captured with a period shift of p/4, a third intermediate image may be captured with a period shift of 2(p/4), and a final intermediate image may be captured with a period shift of 3(p/4)). In an embodiment, one or more of the actuators may be used to adjust the shift of the period of the illumination light, and the camera (e.g., the camera 230 of FIG. 2) may be synchronized to the shifts to enable the camera to capture images at the appropriate times (e.g., a time when the period (p) of the illumination light has been shifted the appropriate amount for the particular intermediate image is to be captured).

Figure 12:
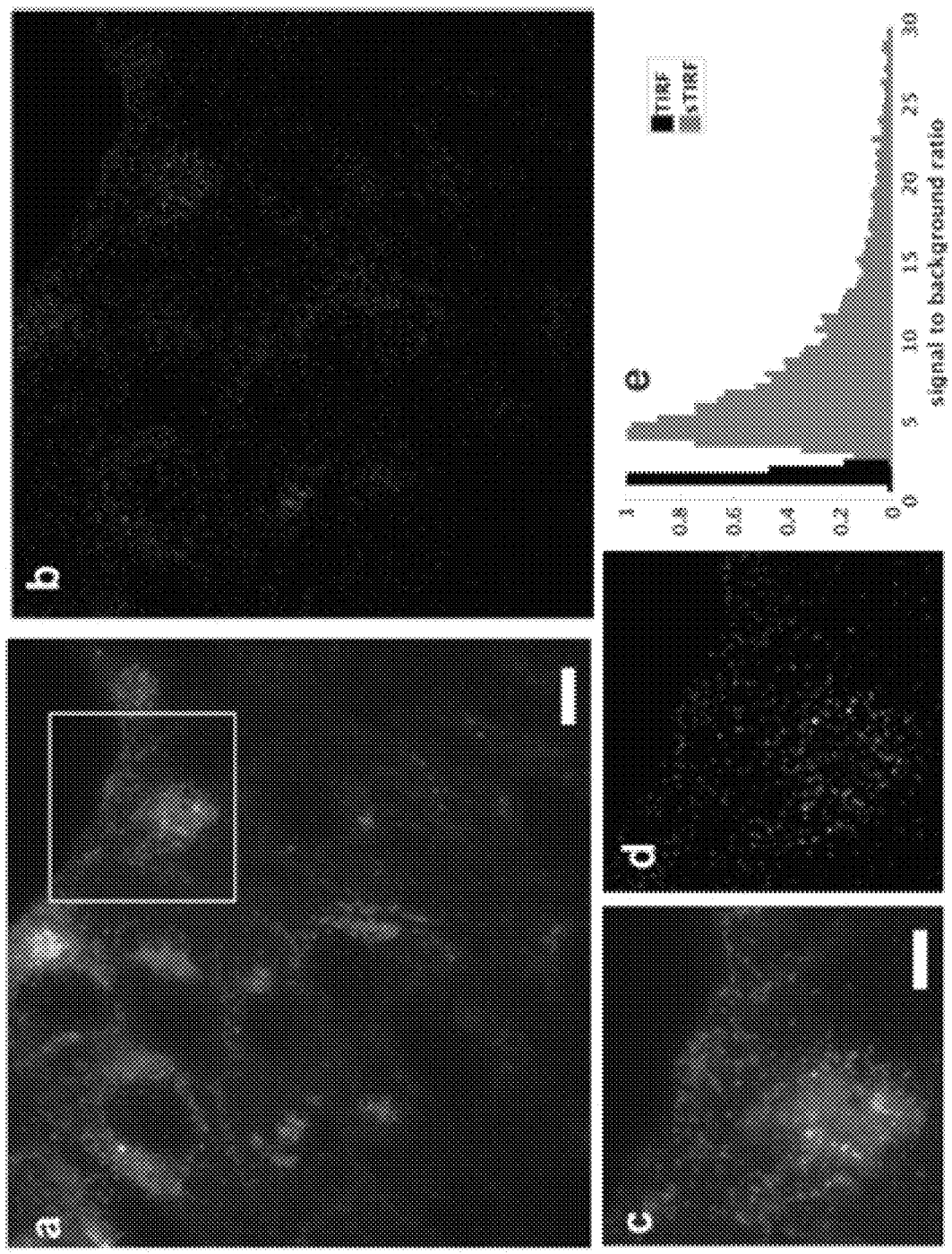
FIG. 12 illustrates various images illustrating aspects of improvements provided by a sTIRF imaging system configured according to embodiments.

Referring to FIG. 12, various images illustrating aspects of improvements provided by a sTIRF imaging system configured according to embodiments are shown. In FIG. 12, signal to background ratio (SBR) of clathrin coated vesicles was measured in IMCD cells expressing eGFP-CLCa. Images (a) and (c) were imaged using a traditional TIRF technique and images (b) and (d) depict the same cells as imaged using a sTIRF imaging technique according to embodiments, where images (c) and (d) show magnified versions of the boxed region of image (a). Image (e) is a normalized histogram of signal to background ratios of detected particles in (a) and (b). Image (b) has been gamma corrected with a gamma factor of 0.8 to better highlight weak features. The scale bar in image (a) represents 10 microns, and the scale bar in image (c) represents 5 microns. As shown in FIG. 12, images As shown in FIG. 12, the IMCD cells form densely packed, epithelial monolayers, as can be seen in FIG. 12 at image (a). Due to increased light scattering of the evanescent field, the cytosolic background did not disappear when imaged using the TIRF imaging technique, thus, the TIRF imaging was more challenging. As shown at FIG. 12 at image (b), the sTIRF imaging technique drastically improved the contrast compared to the conventional TIRF image, which is more readily apparent in images (c) and (d) of FIG. 12. Single particles were identified in both the TIRF and sTIRF image using a locally adaptive detection algorithm, and, for each detected particle, the SBR was determined by dividing the peak intensity by the local background level. Non-fluorescent background, i.e. camera digitizer offset, was subtracted from the data before calculating this ratio. Image (e) of FIG. 12 shows normalized histograms of the SBR of particles detected in TIRF (10111 detected particles) and sTIRF (8308 detected particles). The mode of the distribution (i.e. its peak) increased from an SBR of 1.5 in TIRF to 4.4 in sTIRF. The median SBR increased from 1.7 to 7.7 in TIRF and sTIRF, respectively. As shown in FIG. 12, and as described above, the images generated by the sTIRF imaging system provide improved out of focus blur rejection and have higher contrast (e.g., higher SBR). Thus, a sTIRF imaging system according to embodiments provides improved imaging when compared to traditional TIRF imaging systems and techniques.

Figure 13:
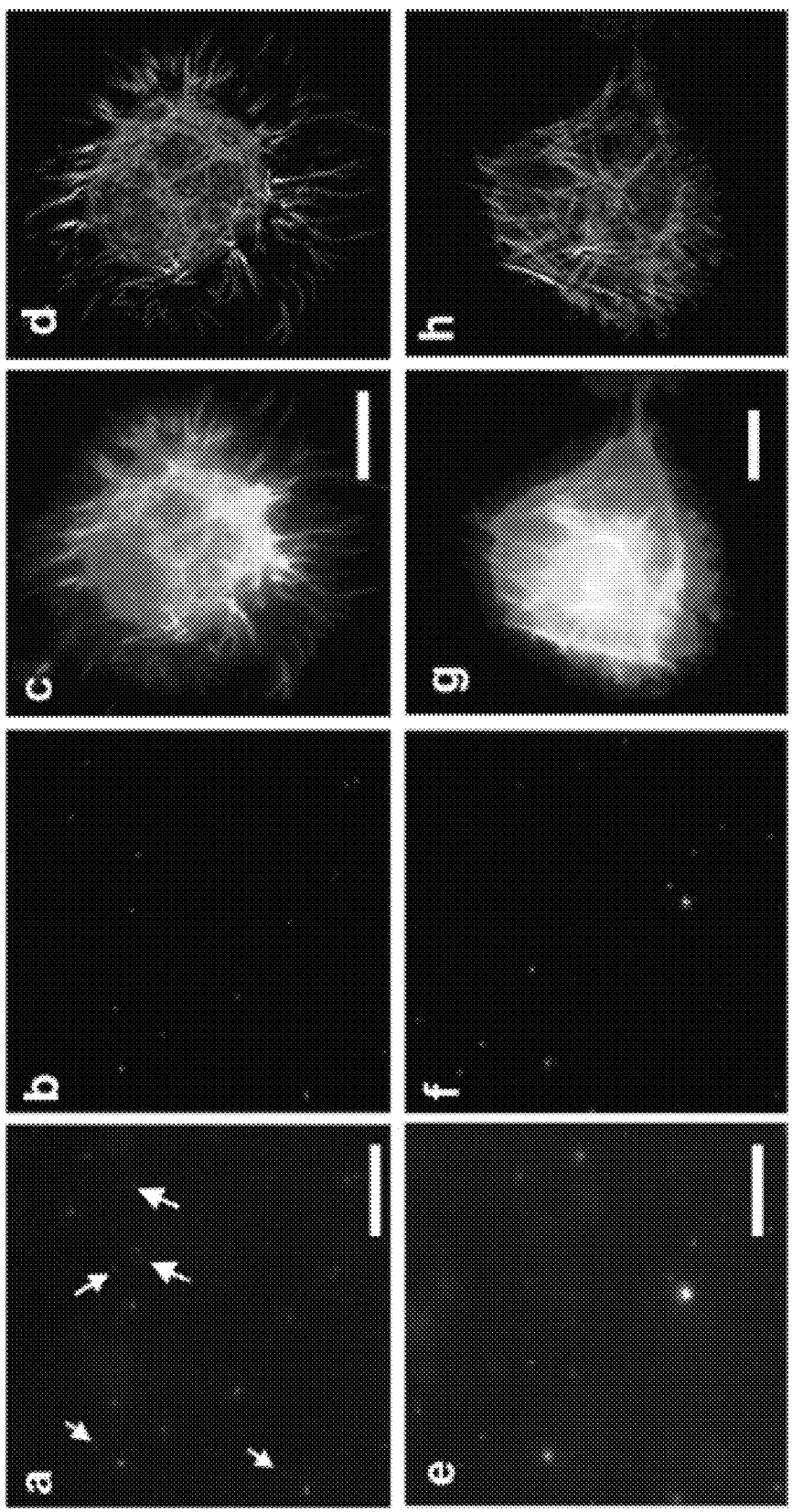
FIG. 13 illustrates various images illustrating aspects of improvements provided by a sHILO imaging system configured according to embodiments.

To image beyond the plasma membrane, the incidence angle of the two laser beams can adjusted slightly below the critical angle, resulting in the oblique illumination scheme referred to in embodiments as a sHILO imaging system or sHILO imaging technique. Referring to FIG. 13, various images illustrating aspects of improvements provided by a sHILO imaging system configured according to embodiments are shown. In FIG. 13, images (a) and (b) are images of 200 nm fluorescent beads mixed with 2% Agarose (resulting in a concentration of ~5×1010 particles/ml), and demonstrate the sectioning performance of HILO and sHILO at shallow angles. The incident angles were calibrated using a large (12 mm thickness) optical flat made of N-BK7, and were determined by measuring the distances from where the laser beams undergo total internal reflection at the glass-air interface to the position of the optical axis of the objective. The optical axis was marked with an auxiliary laser beam that was precisely adjusted to travel along the optical axis of the objective. Potential sample stage tilt was checked by going to the critical angle at opposing sides of the pupil and measuring the incident angles with the optical flat. Standard deviations of the incident angles were determined by repeating the measurements, thus they reflect the measurement error in determining the beam positions, but not other potential error sources (e.g. curvature/tilt of sample coverslip).

When the incident angle was set to 62.2±0.1 degrees (for the Agarose sample, ~62 degrees was estimated to be the critical angle), oblique illumination reduced the fluorescence excitation outside of the depth of focus, as evidenced by only a few slightly out-of-focus beads being visible in image (a), which are removed by sHILO, as shown in image (b). When imaging U2OS cells labeled with tractin-GFP using oblique illumination at an incidence angle of 62.4±0.3 degrees, significant background blur was observed, as shown in image (c). Using sHILO techniques and imaging systems according to embodiments at the same angle, this background is removed, revealing fine actin structures, as shown at image (d). The optical sectioning capability of oblique illumination drastically deteriorates when going below the critical angle. This is illustrated when imaging the same Agarose-bead sample (albeit at a different lateral position) at an incidence angle of 59.3±0.7 degrees. Beads at various levels of defocus create a strong background, shown in image (e), which is effectively removed with sHILO according to embodiments at the same incidence angle, as shown in image (f). When imaging another U2OS cells, oblique illumination at 58.5±0.3 degrees resulted in an image with large out-of-focus blur that overshadows most in focus information, as shown at image (g). The use of sHILO according to embodiments under the same incidence angle provides again excellent contrast, as shown in image (h) and fine cytoskeletal detail becomes visible. As shown in FIG. 13, and as described above, the images generated by the sHILO imaging system provide improved out of focus blur rejection and have higher contrast. Thus, a sHILO imaging system according to embodiments provides improved imaging when compared to traditional HILO imaging systems and techniques.

Owing to its robust out-of-focus rejection and improved image contrast, as well as its simple implementation, imaging systems according to embodiments provide a straight-forward extension to existing TIRF and oblique illumination (or HILO) microscope imaging systems and greatly expand their capabilities. For example, as explained above, imaging systems of embodiments provide improved out of focus blur rejection which provides for higher contrast images to be generated by the imaging systems. Additionally, HILO and sHILO minimize sample irradiance similar to light sheet fluorescence microscopy and thereby reduce photo-bleaching and damage to the sample (e.g., because the entire sample volume is not illuminated). The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method for imaging a sample using an imaging system, the method comprising:

illuminating a sample using a primary beam of light and an interfering beam of light, the interfering beam of light creating interference with respect to the primary beam of light, the interference including an interference pattern;

capturing a plurality of intermediate images of the sample during the illuminating, the plurality of intermediate images including a representation of the interference pattern;

detecting changes between each of the plurality of intermediate images based at least in part on the representation of the interference pattern;

generating a final image of the sample based on the changes detected between each of the plurality of intermediate images;

omitting image components of the plurality of intermediate images that remain static from the final image; and including other image components of the plurality of intermediate images that change in the final image.

2. The method of claim 1,
wherein,
the representation of the interference pattern in the plurality of intermediate images includes a pattern of lines,
the method includes modulating at least one of the primary beam of light or the interfering beam of light to control a characteristic of the pattern of lines,
the characteristic of the pattern of lines includes a line spacing, a line thickness, or both.

3. The method of claim 1,
wherein,
the primary beam of light illuminates the sample at a first angle $\theta_1$,
the interfering beam of light illuminates the sample at a second angle $\theta_2$,
the first angle $\theta_1$ and the second angle $\theta_2$ are between 62 to 72 degrees when the imaging system is operating in a structured total internal reflection fluorescence (sTIRF) illumination mode, and
the first angle $\theta_1$ and the second angle $\theta_2$ are between 59-62 degrees when the imaging system is operating in a structured highly-inclined laminated optical sheet (sHILO) illumination mode relative to a normal to the sample.

4. The method of claim 3,
wherein
the primary beam of light and the interfering beam of light have an azimuthal orientation $\beta$ during the illuminating of the sample,
the first angle $\theta_1$, the second $\theta_2$, and the azimuthal orientation $\beta$ are controlled using mirrors coupled to piezo actuators, and
the azimuthal orientation $\beta$ is approximately 40 degrees.

5. The method of claim 1, further comprising:
splitting a beam of light generated by a light source using a beam splitter to produce the primary beam of light and the interfering beam of light the primary beam of light and the interfering beam of light illuminating the sample from beneath a coverslip, the sample being disposed on the coverslip.

6. The method of claim 1, further comprising,
controlling a polarization of the primary beam of light and the interfering beam of light using a half waveplate.

7. The method of claim 1, wherein the plurality of intermediate images includes at least three intermediate images.

8. The method of claim 1, wherein the interference is based on evanescent fields or highly-inclined laminated optical sheets generated during the illuminating.

9. A non-transitory computer-readable medium storing instructions that, when executed by one or more processors, cause the one or more processors to perform operations for imaging a sample, the operations comprising:
obtaining a plurality of intermediate images of the sample, the plurality of intermediate images of the sample captured during an illumination of the sample using a primary beam of light and an interfering beam of light, the interfering beam of light creating interference with respect to the primary beam of light, the interference including an interference pattern, the plurality of intermediate images including a representation on the interference pattern
detecting changes between each of the plurality of intermediate images based at least in part on the representation of the interference pattern;
generating a final image of the sample based on the plurality of intermediate images;
omitting image components of the plurality of intermediate images that remain static from the final image; and
including other image components of the plurality of intermediate images that change in the final image.

10. The non-transitory computer-readable medium of claim 9,
wherein,
the representation of the interference pattern in the plurality of intermediate images include a pattern of lines,
the operations include modulating at least one of the primary beam of light or the interfering beam of light to control a characteristic of the pattern of lines, and
the characteristic of the pattern of lines include a line spacing, a line thickness, or both.

11. The non-transitory computer-readable medium of claim 9,
wherein,
the primary beam of light illuminates the sample at a first angle $\theta_1$,
the interfering beam of light illuminates the sample at a second angle $\theta_2$,
the primary beam of light and the interfering beam of light have an azimuthal orientation $\beta$ during the illumination of the sample,
the first angle $\theta_1$, the second angle $\theta_2$, and the azimuthal orientation $\beta$ are controlled using mirrors coupled to piezo actuators,
the first angle $\theta_1$ and the second angle $\theta_2$ are between 62 to 72 degrees when an imaging system is operating in a structured total internal reflection fluorescence (sTIRF) illumination mode,
the first angle $\theta_1$ and the second angle $\theta_2$ are between 59-62 degrees when the imaging system is operating in a structured highly-inclined laminated optical sheet (sHILO) illumination mode relative to a normal to the sample, and
the azimuthal orientation $\beta$ is approximately 40 degrees.

12. The non-transitory computer-readable medium of claim 9,
wherein,
the primary beam of light and the interfering beam of light are produced by splitting a beam of light using a beam splitter,
the beam of light is generated by at least one light source,
the primary beam of light and the interfering beam of light illuminate the sample from beneath a coverslip, and
the sample is disposed on the coverslip.

13. The non-transitory computer-readable medium of claim 9, wherein a polarization of the primary beam of light and the interfering beam of light is controlled using a half waveplate.

14. The non-transitory computer-readable medium of claim 9, wherein the interference is based on evanescent fields or highly-inclined laminated optical sheets generated during the illumination of the sample.

15. An imaging system configured to image a sample, the imaging system comprising:
a light source configured to generate a beam of light;
a beam splitter configured to split the beam of light into a primary beam of light and an interfering beam of light;
one or more mirrors configured to direct the primary beam of light and the interfering beam of light toward the sample, the interfering beam of light being configured to create interference with respect to the primary beam of light during illumination of the sample, the interference including an interference pattern;
one or more cameras configured to capture a plurality of intermediate images of the sample during the illumination of the sample, the plurality of intermediate images including a representation of the interference pattern; and one or more processors configured to generate a final image of the sample based on changes detected between each of the plurality of intermediate images based at least in part on the representation of the interference pattern, image components of the plurality of intermediate images that remain static being omitted from the final image and other image components of the plurality of intermediate images that change being included in the final image.

16. The imaging system of claim 15, wherein the representation of the interference pattern in the plurality of intermediate images comprises a pattern of lines, the one or more mirrors being configured to control, at least in part, a characteristic of the pattern of lines, the characteristic of the pattern of lines comprising a line spacing, a line thickness, or a combination thereof.

17. The imaging system of claim 15,
wherein,
the primary beam of light illuminates the sample at a first angle $\theta_1$,
the interfering beam of light illuminates the sample at a second angle $\theta_2$,
the primary beam of light and the interfering beam of light have an azimuthal orientation $\beta$ during the illumination of the sample,
the imaging system includes: one or more piezo actuators,
the one or more mirrors and the one or more piezo actuators are configured to control the first angle $\theta_1$, the second angle $\theta_2$, and the azimuthal orientation $\beta$,
the first angle $\theta_1$ and the second angle $\theta_2$ are between 62 to 72 degrees when the imaging system is operating in a structured total internal reflection fluorescence (sTIRF) illumination mode,
the first angle $\theta_1$ and the second angle $\theta_2$ are between 59-62 degrees when the imaging system is operating in a structured highly-inclined laminated optical sheet (sHILO) illumination mode relative to a normal to the sample, and
the azimuthal orientation $\beta$ is approximately 40 degrees.

18. The imaging system claim 15, further comprising:
a half waveplate configured to control a polarization of the primary beam of light and the interfering beam of light.

19. The imaging system of claim 15, wherein the sample is imaged using a structured total internal reflection fluorescence (sTIRF) technique, a structured highly-inclined laminated optical sheet (sHILO) technique, or both.

20. The imaging system of claim 15, wherein the interference is based on evanescent fields or highly-inclined laminated optical sheets generated during the illumination of the sample.

* * * * *